United States Patent [19]

Geisler

[11] Patent Number: 5,004,536

[45] Date of Patent: Apr. 2, 1991

[54] WATER RECLAMATION APPARATUS

[76] Inventor: Edward Geisler, 150 Pfaff Dr., Frankfort, Ill. 60423

[21] Appl. No.: 343,047

[22] Filed: Apr. 25, 1989

[51] Int. Cl.$^5$ .................... B60S 3/00; B01D 29/00
[52] U.S. Cl. .................... 210/136; 15/DIG. 2; 134/511; 137/512; 137/565; 210/167; 210/238; 210/416.1
[58] Field of Search ........... 210/136, 167, 194, 195.1, 210/196, 416.1, 513, 532.1, 237, 238, 117, 137; 137/512, 565, 577.5, 577, 615, 578, 579; 417/199.2, 200; 15/DIG. 2; 239/587, 588

[56] References Cited

U.S. PATENT DOCUMENTS

| 534,878 | 2/1895 | Harris | 137/577.5 |
|---|---|---|---|
| 555,147 | 2/1896 | Burck | 239/588 |
| 743,006 | 11/1903 | Loucks | 210/136 |
| 788,721 | 5/1905 | Johnson | 210/532.1 |
| 974,044 | 10/1910 | Elliot | 210/237 |
| 1,070,778 | 8/1913 | Elliot | 210/237 |
| 1,169,792 | 2/1916 | French | 210/136 |
| 1,473,667 | 11/1923 | Burks | 210/136 |
| 1,837,780 | 12/1931 | Lake | 210/136 |
| 1,971,330 | 8/1934 | Carroll | 210/136 |
| 2,352,356 | 6/1944 | Albertson | 210/416.1 |
| 3,118,610 | 1/1964 | Techler | 137/565 |
| 3,263,341 | 8/1966 | Allen | 15/DIG. 2 |
| 3,454,042 | 7/1969 | Phillips | 137/565 |
| 3,774,625 | 11/1973 | Wiltrout | 210/167 |
| 4,168,232 | 9/1979 | Allen et al. | 210/194 |
| 4,333,495 | 6/1982 | Griswold et al. | 137/512 |
| 4,336,134 | 6/1982 | Prior | 210/136 |
| 4,500,425 | 2/1985 | Thornton et al. | 210/136 |
| 4,652,368 | 3/1987 | Ennis et al. | 210/167 |

FOREIGN PATENT DOCUMENTS

| 0074034 | 3/1983 | European Pat. Off. | 210/136 |
|---|---|---|---|
| 133943 | 8/1983 | Japan | 15/DIG. 2 |

Primary Examiner—Robert A. Dawson
Assistant Examiner—Joseph Drodge
Attorney, Agent, or Firm—Howard B. Rockman

[57] ABSTRACT

A water reclamation apparatus for recycling water in a system including a reclamation tank for holding water to be recycled, a first conduit for conveying water to the reclamation tank, a second conduit for conveying water from the reclamation tank, an outlet hose extending from the second conduit to a point beneath the level of the water in the reclamation tank, the outlet hose including two check valves operatively connected in series to allow water to flow through the outlet hose from the reclamation tank, and to prevent water from flowing into the reclamation tank from the outlet hose under conditions where one of the check valves is held in an open position. The outlet hose is flexible and can be extended through an access portion of the reclamation tank to allow the check valves to be serviced.

18 Claims, 1 Drawing Sheet

WATER RECLAMATION APPARATUS

FIELD OF THE INVENTION

This invention relates to an apparatus for filtering water. More specifically, this invention relates to an apparatus for filtering out bristles and other foreign matter from the used water of a car wash, said apparatus comprising a series of water settling tanks and an outlet hose assembly for delivering the recycled water back to the car wash.

BACKGROUND OF THE INVENTION

The typical car wash water reclamation apparatus comprises a series of settling tanks located beneath the car wash and an outlet hose assembly. The used water from the car wash enters the settling tanks, where it is subject to a natural gravitational filtration process, and is then delivered back to the car wash through the outlet hose assembly. The used water, having been used for washing dirty automobiles and draining generally from the floor of the car wash, contains bristles from the car wash brushes, dirt, stones and other foreign matter. The basic objective of any car wash water reclamation apparatus, therefore, is to remove this foreign matter from the water so that clean water can be recycled and used again in the car wash, thus conserving water and reducing the expenses associated with operating a car wash.

In the typical car wash water reclamation apparatus, used water enters the first of several settling tanks through a drain in the car wash floor. A large percentage of the foreign matter filters out of the used water in this first settling tank. The water then flows, via a connecting pipe, to a second or intermediate settling tank, where the force of gravity acts to separate out finer particles from the used water. The water then flows, via a connecting pipe, to a reclamation tank, from where it is pumped back to the car wash through an outlet hose assembly.

The typical outlet hose assembly consists of a rigid pipe extending vertically from the top of the reclamation tank down into the water. A standard foot valve is attached to the intake end of the rigid vertical pipe. A pump is connected to the outlet hose assembly, and the foot valve operates to close off the inlet of the outlet hose assembly when the pump is not in operation. The foot valve also operates to prime or retain water in the outlet hose assembly when the water level in the reclamation tank drops below the end of the outlet hose assembly, thus maintaining a primed pump.

Unfortunately, bristles and other foreign matter occasionally find their way into the reclamation tank and are drawn into the foot valve, keeping the valve constantly open, allowing water in the outlet hose assembly to drop back into the reclamation tank by virtue of a back-siphon, thus emptying or depriming the outlet hose assembly. This allows undesirable air to enter the supply line to the water pump, which could damage the pumps. When this happens, the supply of recycled water is also greatly diminished. Thus, to retain the benefit of the car wash water reclamation apparatus, the foot valve must be cleared of foreign debris.

In order to clear the foot valve in the typical car wash water reclamation apparatus, the car wash must be shut down and an attendant must gain access to the foot valve in the reclamation tank through an opening in the top of the tank. The attendant may either first drain the tank, enter the tank, and manually clear the foot valve, or enter the full tank and manually clear the foot valve while submerged in the water. The inconveniences associated with either method are obvious.

Furthermore, if the attendant decides to drain the tank and the foreign debris in the foot valve has caused the foot valve to remain open, the water in the outlet hose assembly will discharge into the reclamation tank, further requiring the attendant to refill the outlet hose assembly, or prime the pump, before reactivating the pump.

Therefore, an object of the present invention is to provide an outlet hose assembly that allows the foot valve to be cleared without entering the reclamation tank. The present invention achieves this object by providing a flexible outlet hose assembly that allows an attendant to lift the foot valve to the opening at the top of the reclamation tank for clearing from outside the reclamation tank. The flexible outlet hose assembly thus eliminates the need to enter the reclamation tank to clear the foot valve.

When the foot valve is raised above the water level, however, if foreign debris causes the foot valve to remain open, the water in the outlet hose assembly will discharge into the reclamation tank, therefore requiring an attendant to prime the pump before the pump can be reactivated. Therefore, a second object of the present invention is to provide means to prevent the water in the outlet hose assembly from discharging into the reclamation tank when the foot valve is being cleared. The present invention achieves this object by placing a springloaded, one-way check valve in the outlet hose in combination with the foot valve. The check valve remains closed when the pump is turned off and thus keeps the outlet hose assembly primed at all times, regardless of whether the foot valve is open or closed.

BRIEF DESCRIPTION OF THE DRAWINGS

The foregoing and other and additional objects of the present invention will be readily appreciated by those skilled in the art upon gaining an understanding of the invention as described in the following detailed description and shown in the accompanying drawings in which.

DETAILED DESCRIPTION OF THE INVENTION

The present invention contemplates a water reclamation apparatus which employs an outlet hose assembly which is easy clear of foreign debris and which remains primed during the clearing operation.

Figure 1:
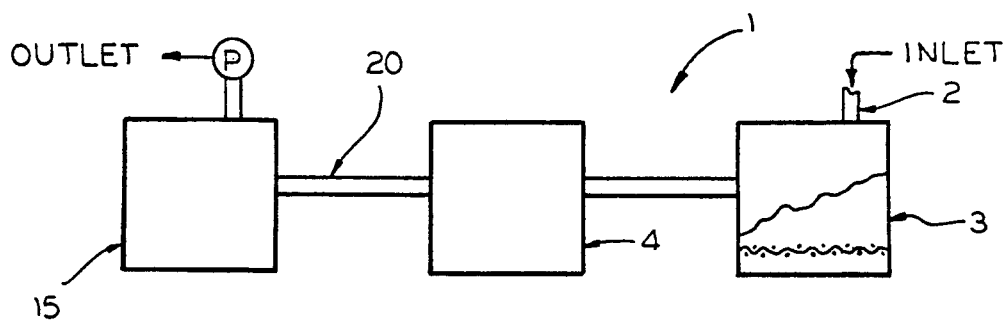
FIG. 1 is a schematic view of the water settling tanks and the reclamation tank with which the present invention is associated.

Referring to FIG. 1, used water from a car wash, or other source, enters a reclamation apparatus 1 through an indicated generally at 2. The water enters a first settling tank 3, where larger debris is separated out from the water. The water then flows into a second or intermediate settling tank 4, where the force of gravity acts to separate out the finer particles from the water. After passing through intermediate settling tank 4, the water flows into a reclamation tank 15 through inlet conduit 20. The water in reclamation tank 15 is substantially free of debris and is ready to be re-cycled back to the car wash.

Figure 2:
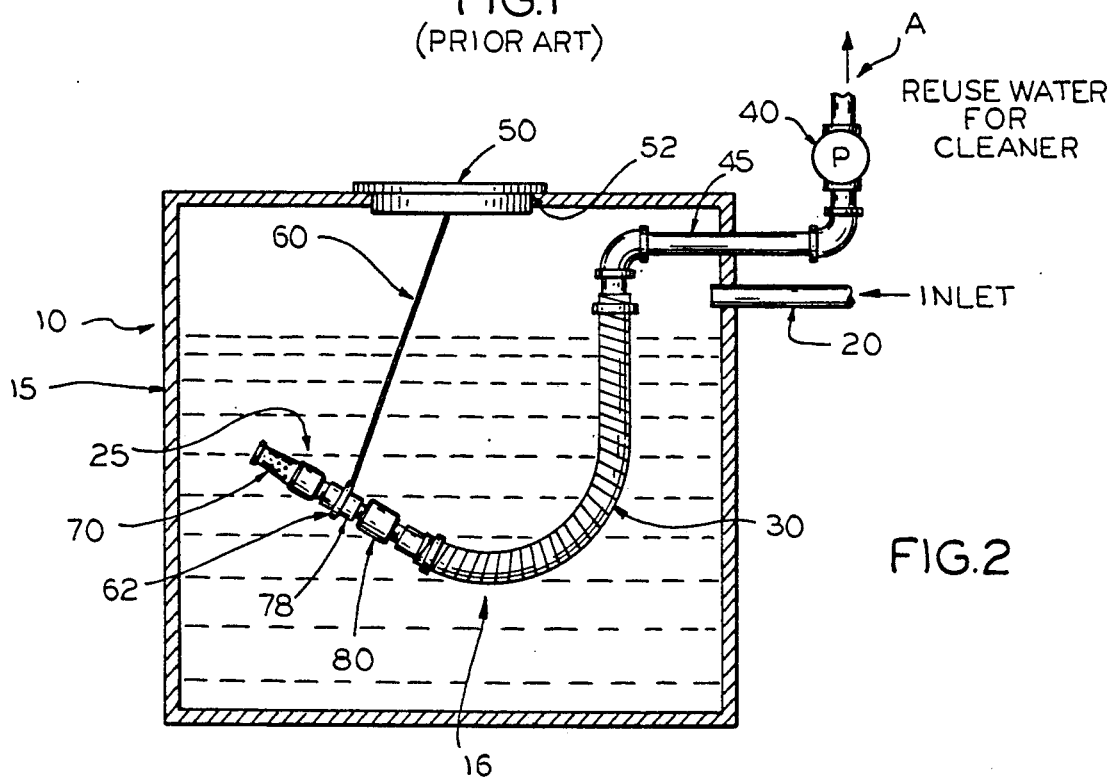
FIG. 2 is a front cross-sectional view of the reclamation tank, showing the outlet hose assembly and the pump.

As seen in FIG. 2, a pump 40 draws the water in reclamation tank 15 through outlet hose assembly 16 for delivered to the car wash, as indicated by the arrow A.

The outlet hose assembly 16 comprises inlet valve means 25, flexible hose 30 and a length of rigid conduit or pipe 45 to which hose 30 is attached. The pump 40 operates to draw the water through the inlet valve means 25, hose 30, and rigid pipe 45. The length of outlet hose assembly 16 is defined by the lengths of the inlet valve means 25 and flexible hose 30, and should be sufficient to maintain inlet valve means 25 at a distance from the bottom of reclamation tank 15 to prevent debris at the bottom of reclamation tank 15 from being readily drawn into inlet valve means 25.

A chain or rope 60 is connected to intermediate portion 78 of valve assembly 25 by means of a collar 62. The opposite end of chain or rope 60 is connected to cover 50, which removably fits in the opening 52 of reclamation tank 15.

An advantage of the present invention is appreciated by reference to FIG. 2. Should inlet valve means 25 of outlet hose assembly 16 become clogged, an attendant need simply remove cover 50 of reclamation tank 15 and raise the inlet valve means 25 to opening 52 by way of chain or rope 60. The inlet valve means 25 is allowed to move relative to rigid pipe 45 due to the flexibility of hose 30. Flexible hose 30 is constructed of a lithe, non-collapsible tubing, which maintains a substantially circular cross-section during bending. The flexible hose 30 should be of sufficient length to allow the inlet valve means 25 to be raised to opening 52 of reclamation tank 15. Thus, the need for an attendant to enter the tank to perform the clearing function is eliminated.

Figure 3:
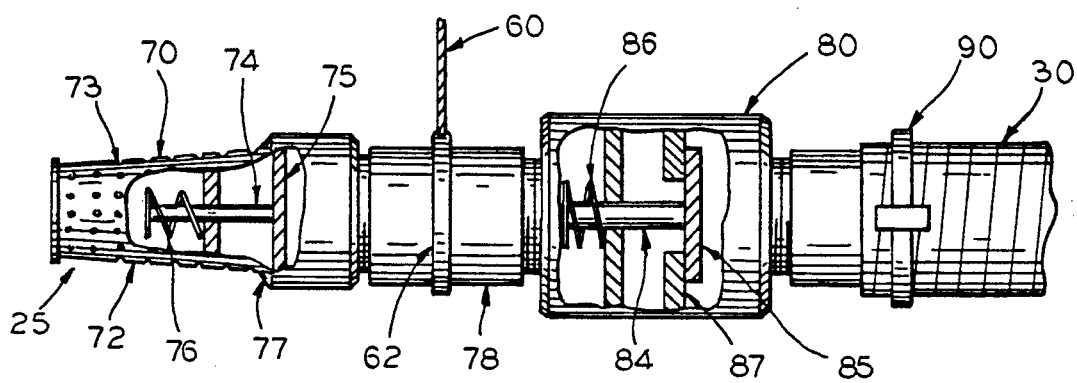
FIG. 3 is an enlarged view of the inlet end of the outlet hose assembly, showing the check valve in combination with the foot valve.

As depicted in FIG. 3, inlet valve means 25 comprises a spring-loaded, one-way foot valve 70 and a spring-loaded, one way check valve 80, connected by a short length of pipe 78. The foot valve 70 and check valve 80 are of the type generally known.

Foot valve 72 comprises a conical end piece 72 having holes or perforations 73 and a poppet valve 74 connected to a spring 76. The force of spring 76 retains the valve element 75 of poppet valve 74 in a closed position against valve seat 77.

The short length of pipe 78 connects foot valve 70 to check valve 80. Pipe 78 also provides a location for connecting chain or rope 60 to the inlet valve means 25. Chain or rope 60 is connected to collar 62 which extends around and is attached to pipe 78.

Check valve 80 comprises a poppet valve 84 having a valve element 85 connected to a spring 86. The force of spring 86 retains the valve element 85 of poppet valve 84 in a closed position against valve seat 87.

Hose 30 is connected at one end to check valve 80 by means of a hose clamp 90 or any other suitable means. The opposite end of hose 30 is similarly connected to pipe 45 by means of a hose clamp or any other suitable means.

When pump 40 is in operation, the resulting decrease in pressure upstream of the inlet valve means 25 causes valve element 85 of poppet valve 84 to overcome the force of spring 86 and displace from valve seat 87, thereby allowing water to flow through check valve 80. The resulting decrease in pressure immediately upstream of foot valve 70 causes valve element 75 of poppet valve 74 to overcome the force of spring 76 and displace from valve seat 87, thereby allowing water to flow through foot valve 70. Consequently, water in reclamation tank 15 is drawn through the outlet hose assembly 16 and is delivered by pump 40 back to the car wash.

An advantage of the present invention can be appreciated by reference to FIG. 3. For pump 40 to be readily operational, outlet hose assembly 16 must be fully primed with water. In the typical outlet hose assembly, if the presence of bristles or other foreign matter causes the poppet valve 74 of foot valve 70 to remain open, the raising of foot valve 70 by way of chain or rope 60 would cause the water to discharge from the outlet hose assembly when foot valve 70 reaches the level of water in reclamation tank 15. Since the inlet valve means 25 of the present invention comprises a check valve 80 in combination with foot valve 70, however, the water will remain in the outlet hose assembly 16 at all times, regardless of whether foot valve 70 is open or closed. Therefore, the need to prime pump 40 after clearing in those situations where foot valve 70 is held open by bristles or foreign mater is eliminated, since water remains in the outlet hose assembly 16 during the clearing operation.

The foregoing description is for purposes of illustration rather than limitation of the scope of protection accorded this invention. The latter is to be measured as broadly as the invention permits.

I claim:

1. A vehicle washing water reclamation apparatus for recycling water in a system comprising a vehicle washing water reclamation tank for holding water to be recycled and a selectively actuated pump, said water reclamation apparatus further comprising:

first conduit means for conveying water to said reclamation tank;

second conduit means, coupled to said pump, for conveying water from said reclamation tank; and an outlet hose extending from said second conduit means to a point beneath the level of said water in said reclamation tank, said outlet hose including two one-way valve means operatively connected in series for allowing water to flow in the same direction from said reclamation tank through both of said valve means and said second conduit means to said pump, and for preventing water from flowing back into said reclamation tank from said outlet hose in the event that one of said valve means in held in an open position, constructed and arranged to retain water in said outlet hose at all times including periods when said pump is not activated.

2. The vehicle washing water reclamation apparatus of claim 1 wherein at least a portion of said outlet hose is flexible.

3. The vehicle washing water reclamation apparatus of claim 1 wherein said reclamation tank includes means for obtaining access to the inside of said water reclamation tank, lifting means, extending from said access means to a portion of said outlet hose disposed beneath said water level which includes at least one of said valve means, for enabling one end of said outlet hose to be lifted out of the water and positioned adjacent said access means thus enabling said valve means to be cleared in the case of accidental clogging.

4. The vehicle washing water reclamation apparatus of claim 1 wherein said two one-way valve means comprises a foot valve and a check valve in series.

5. A water reclamation apparatus for recycling water in a system including a reclamation tank for holding water to be recycled, first conduit means for conveying water to said reclamation tank, outlet means for conveying water from said reclamation tank, said outlet means including second conduit means for conveying water from said reclamation tank, a selectively actuated pump located above the level of the water in the tank and coupled to said second conduit means, and an outlet hose, said outlet hose extending from said second conduit means into said reclamation tank and having collar means for connection to a rope or chain to facilitate removal of one end of said outlet hose from said reclamation tank, first one-way valve means connected adjacent one end of said outlet hose for allowing water in said reclamation tank to flow in only one direction from said tank through said outlet hose to said second conduit means when said pump is actuated and preventing the flow of water from said outlet hose back to said tank when said pump is not actuated, second one-way valve means located in said outlet hose for allowing water to flow in only one direction through said outlet hose from said first valve means to said second conduit means when said pump is actuated and preventing the flow of water out of said outlet hose back into said reclamation tank when said pump is not actuated and regardless of the condition of said firsts valve means, whereby water remains in said outlet hose at all times.

6. The water reclamation apparatus of claim 5 wherein said outlet hose is substantially flexible.

7. The water reclamation apparatus of claim 6 wherein said flexible outlet hose maintains a substantially circular cross-section upon bending.

8. The water reclamation apparatus of claim 5 wherein said reclamation tank includes access means for obtaining access to the outlet hose, and lifting means, extending from said access means to said collar means, for enabling one end of said outlet hose to be withdrawn from the water in said reclamation tank and to be accessible through said access means.

9. The water reclamation apparatus of claim 5 wherein said first valve means is a foot valve attached at said one end of said outlet hose.

10. The water reclamation apparatus of claim 5 wherein said second valve means is a check valve.

11. A water reclamation system for recycling water comprising:
a reclamation tank for holding water to be recycled,
first conduit means for conveying water to said reclamation tank,
second conduit means for conveying water from said reclamation tank,
a substantially flexible outlet hose extending from said second conduit means to a point beneath the level of said water in said reclamation tank, said outlet hose including one-way valve means for regulating the direction of water flow through said outlet hose from said reclamation tank,
said reclamation tank including access means for obtaining access to said outlet hose, lifting means, extending from said access means to a portion of said outlet hose disposed beneath said water level which includes said valve means, for enabling said portion of said outlet hose to be lifted out of the water and positioned adjacent said access means thus enabling said valve means to be cleared in the case of accidental clogging.

12. The vehicle washing water reclamation system of claim 11 further comprising means, coupled to said conduit means, for pumping water out of said water reclamation tank through said conduit means.

13. A vehicle washing water reclamation system comprising:
a vehicle washing water reclamation tank for holding water to be recycled,
means for pumping water out of said tank,
conduit means for conveying water from said reclamation tank, a first end of said conduit means extending beneath the level of said water in said reclamation tank, a second end of said conduit means being coupled to said pumping means;
filter means coupled to the first end of said conduit means for preventing debris in the reclamation tank from entering said conduit means; and
first and second individual one-way valve means, operatively connected in series within said conduit means, for allowing water to flow from said reclamation tank through said conduit means and for preventing water from flowing back into said reclamation tank form said conduit means under conditions where one of said valve means is held in an open position, constructed and arranged to retain water in said conduit means at all times, including periods when said pump is not activated.

14. The vehicle washing water reclamation system of claim 13 wherein said first valve means is a foot valve coupled to said filter means, said foot valve including a spring-loaded poppet valve.

15. The vehicle washing water reclamation system of claim 13 wherein said second valve means is a check valve, said check valve including a spring-loaded poppet valve.

16. The vehicle washing water reclamation system of claim 13 wherein said conduit means includes a flexible hose portion disposed substantially at said first end of said conduit means.

17. The vehicle washing water reclamation system of claim 16 wherein said flexible hose portion includes a rigid collar means for attaching a chain or rope extending above the water, whereby said filter means can be lifted above the water level.

18. The vehicle washing water reclamation system of claim 16 wherein said reclamation tank includes access means for obtaining access to the inside of said water reclamation tank, cover means for closing said access means, lifting means, coupled to said cover means and extending to said filter means disposed beneath said water level, for enabling one end of said flexible hose portion to be lifted out of the water and positioned adjacent said access means thus enabling said filter means to be cleaned.

* * * * *

UNITED STATES PATENT AND TRADEMARK OFFICE
CERTIFICATE OF CORRECTION

PATENT NO. : 5,004,536

DATED : April 2, 1991

INVENTOR(S) : Edward Geisler

It is certified that error appears in the above-identified patent and that said Letters Patent is hereby corrected as shown below:

Column 2, line 59, delete "easy" and insert --easy to--;

Column 2, line 61, delete "or" and insert --or some--;

Column 2, line 63, delete "an" and insert -- and inlet--;

In the claims, column 4 line 49, delete "in" and insert --is--;

Signed and Sealed this

Eighth Day of December, 1992

Attest:

DOUGLAS B. COMER

Attesting Officer

Acting Commissioner of Patents and Trademarks